US010807706B2

(12) United States Patent
Joussellin et al.

(10) Patent No.: US 10,807,706 B2
(45) Date of Patent: Oct. 20, 2020

(54) JETTISONABLE EMERGENCY EXIT FOR A VEHICLE

(71) Applicants:AIRBUS HELICOPTERS DEUTSCHLAND GMBH, Donauworth (DE); AIRBUS HELICOPTERS, Marignane (FR)

(72) Inventors: Fabrice Joussellin, Augsburg (DE); Aurelien Vayssiere, Niederschoenenfeld GT Feldheim (DE); Pierre Fruitet, Pompignan (FR); Laure-Anne Mathieu, Larajasse (FR); Hassene Heboub, Lyons (FR); Philippe Benentendi, Chaponost (FR)

(73) Assignees: AIRBUS HELICOPTERS DEUTSCHLAND GMBH, Donauworth (DE); AIRBUS HELICOPTER, Marignane (FR)

( * ) Notice: Subject to any disclaimer, the term of this patent is extended or adjusted under 35 U.S.C. 154(b) by 936 days.

(21) Appl. No.: 15/169,906

(22) Filed: Jun. 1, 2016

(65) Prior Publication Data

US 2016/0355249 A1    Dec. 8, 2016

(30) Foreign Application Priority Data

Jun. 5, 2015  (EP) .................................... 15400023

(51) Int. Cl.
*B64C 1/32* (2006.01)
*B64C 27/04* (2006.01)
*B64C 1/14* (2006.01)

(52) U.S. Cl.
CPC ............ *B64C 27/04* (2013.01); *B64C 1/1492* (2013.01)

(58) Field of Classification Search
CPC ..... B64C 27/04; B64C 1/1492; B64C 1/1407; B60J 1/085; B60J 5/047; B61D 19/023; B61D 19/026; B64D 25/08; E05C 9/00
See application file for complete search history.

(56) References Cited

U.S. PATENT DOCUMENTS 3,851,845 A  12/1974  Edwards
4,102,011 A   7/1978  Clack, Jr.
(Continued)

FOREIGN PATENT DOCUMENTS

CN       1236348 A    11/1999
CN     201512110 U     6/2010
(Continued)

OTHER PUBLICATIONS

First Office Action for Chinese Application No. 201610394676.2 dated Jan. 3, 2018, 8 pages.
(Continued)

*Primary Examiner* — Medhat Badawi
*Assistant Examiner* — Vicente Rodriguez
(74) *Attorney, Agent, or Firm* — Brooks Kushman P.C.

(57) ABSTRACT

A jettisonable emergency exit for a vehicle, comprising an outer peripheral edge that is adapted to be accommodated in an associated frame provided in a vehicle, wherein at least one emergency exit retention means and at least one emergency exit locking device are integrated into the outer peripheral edge, the at least one emergency exit retention means comprising at least one non-retractable pivot finger around which the jettisonable emergency exit is rotatable in an emergency mode, and the at least one emergency exit locking device comprising at least one locking hook that is adapted for locking the jettisonable emergency exit in an associated locking position in normal operation mode and
(Continued)

(A)                (B)

for releasing the jettisonable emergency exit in an associated retracted position in the emergency mode.

18 Claims, 11 Drawing Sheets

(56) References Cited

U.S. PATENT DOCUMENTS

| | | | | |
|---|---|---|---|---|
| 5,031,863 | A * | 7/1991 | Noble | B64C 1/1407 244/129.5 |
| 5,826,824 | A * | 10/1998 | Martin | B64C 1/32 244/129.3 |
| 6,027,073 | A | 2/2000 | Gratien Ferrier | |
| 6,341,748 | B1 * | 1/2002 | Brooks | B64C 1/1407 244/129.5 |
| 6,427,383 | B1 * | 8/2002 | Brooks | B64C 1/32 49/141 |
| 6,932,395 | B1 * | 8/2005 | du Bois | B60J 9/00 292/125 |
| 7,730,668 | B2 * | 6/2010 | Dankert | B61D 19/023 49/141 |
| 8,333,036 | B2 * | 12/2012 | Helms | B60J 1/085 49/141 |
| 8,826,597 | B2 | 9/2014 | Raspic | |
| 8,833,840 | B2 | 9/2014 | Diamant et al. | |
| 8,998,141 | B2 | 4/2015 | Bergonnier et al. | |
| 9,527,574 | B2 * | 12/2016 | Steger | B64C 1/32 |
| 2012/0085033 | A1 | 4/2012 | Krahl | |
| 2012/0227325 | A1 * | 9/2012 | Diamant | B60J 1/16 49/149 |
| 2013/0200214 | A1 * | 8/2013 | Sumner | B64C 1/1407 244/129.5 |

FOREIGN PATENT DOCUMENTS

| | | |
|---|---|---|
| CN | 102673773 A | 9/2012 |
| CN | 103075067 A | 5/2013 |
| DE | 20217925 | 3/2003 |
| EP | 2505491 | 10/2012 |
| EP | 2626294 A2 | 8/2013 |
| EP | 2626294 A3 | 10/2013 |
| GB | 526648 | 9/1940 |

OTHER PUBLICATIONS

Extended European Search Report for European Application No. EP 15400023.6, Completed by the European Patent Office, Dated Mar. 18, 2016, 13 Pages.

Partial European Search Report for European Application No. EP 15400023.6, Completed by the European Patent Office, Dated Nov. 23, 2015, 9 Pages.

* cited by examiner

Fig. 3
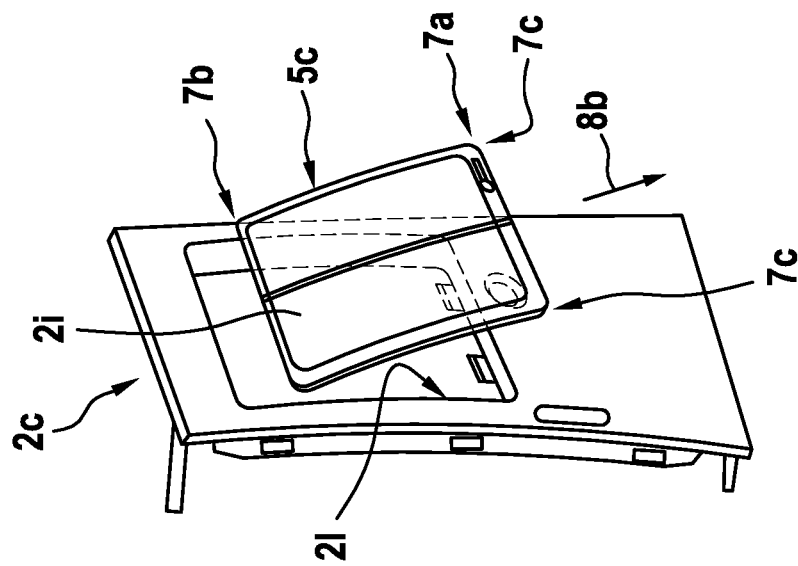
(A)
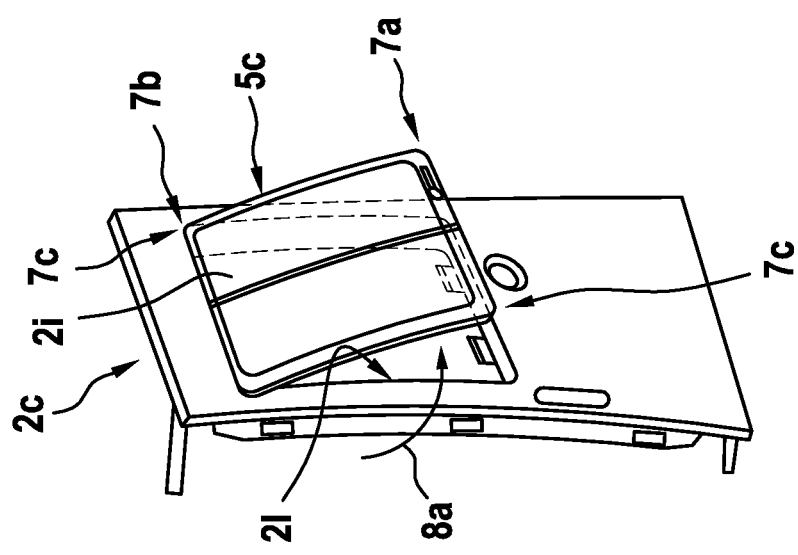
(B)
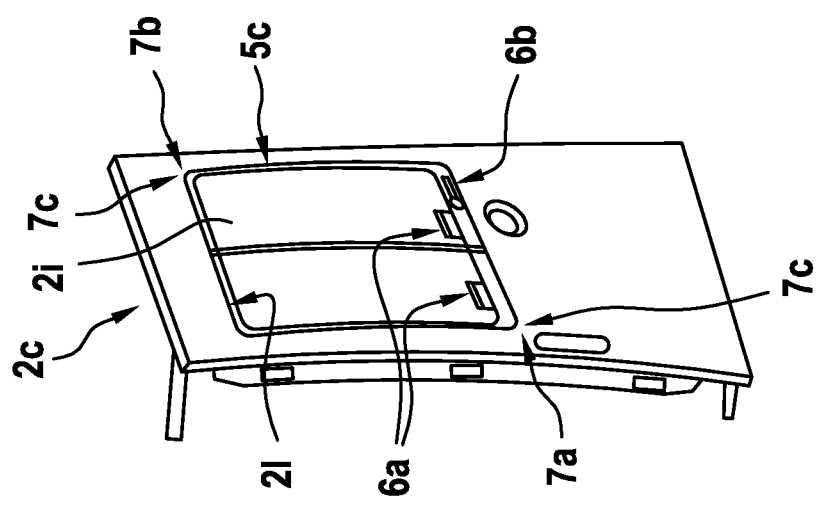
(C)

Fig. 15
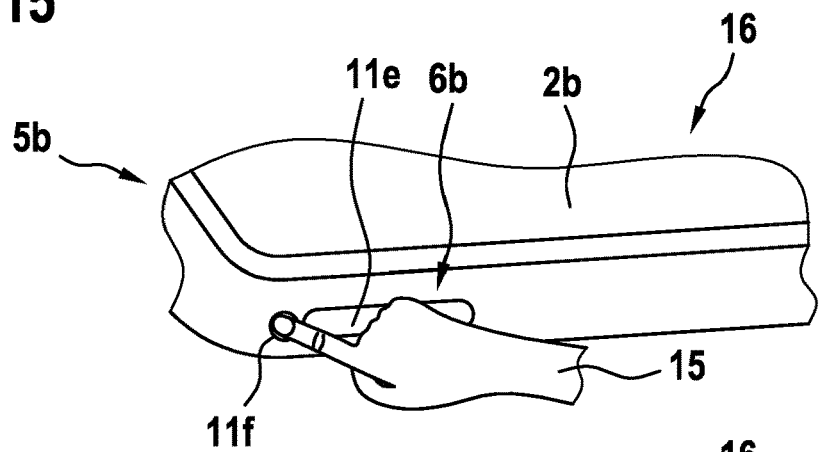
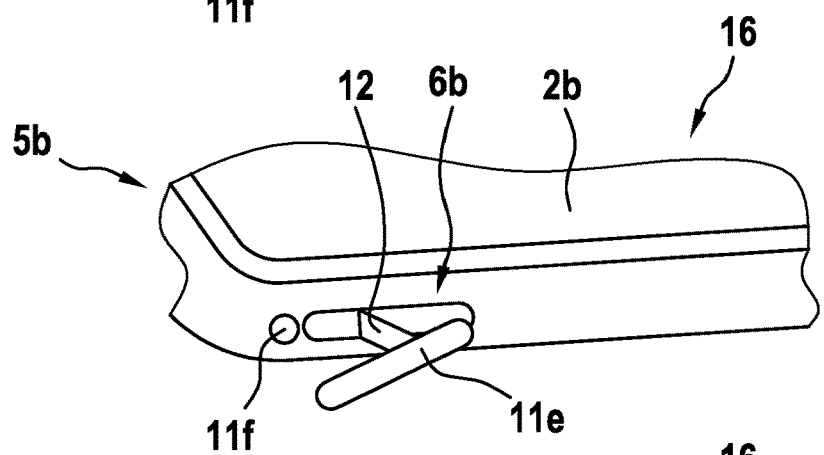
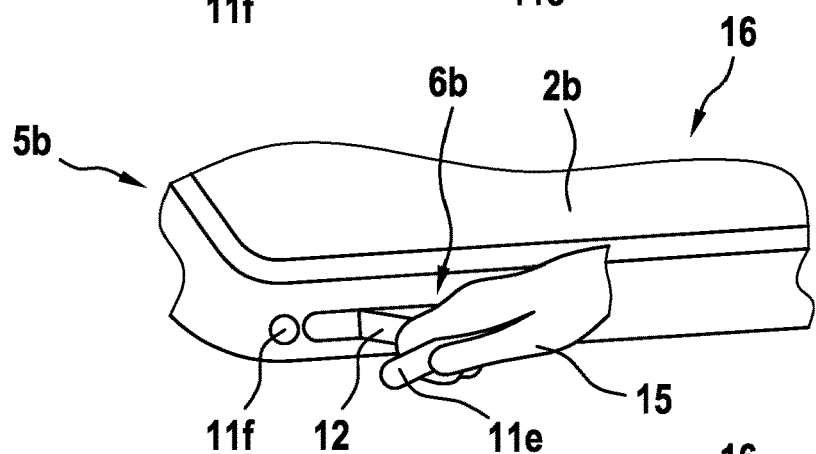
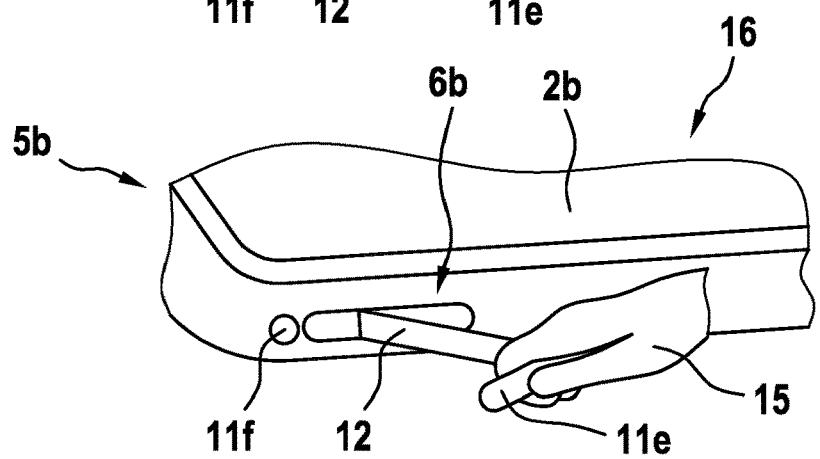

JETTISONABLE EMERGENCY EXIT FOR A VEHICLE

CROSS REFERENCE TO RELATED APPLICATION

This application claims priority to European patent application No. EP 15400023.6 filed on Jun. 5, 2015, the disclosure of which is incorporated in its entirety by reference herein.

BACKGROUND OF THE INVENTION

(1) Field of the Invention

The present invention is related to a jettisonable emergency exit for a vehicle, comprising an outer peripheral edge that is adapted to be accommodated in an associated frame provided in a vehicle, said jettisonable emergency exit comprising the features of claim 1. The present invention is further related to a method of releasing a jettisonable emergency exit for ejection from an associated vehicle, said method comprising the features of claim 16.

(2) Description of Related Art

Various vehicles are provided with security structures, such as emergency exits. For instance, aircrafts and, by way of example rotary wing aircrafts, comprise emergency exits that are required in order to allow passengers and crew members to exit the rotary wing aircrafts rapidly and securely in case of an emergency. Therefore, the emergency exits must be arranged in the rotary wing aircrafts in a manner that allows a quick and easy opening and/or removal thereof in order to enable a fast and secure evacuation of the aircrafts in case of an emergency. This is frequently achieved by implementing at least part of the emergency exits in rotary wing aircrafts by means of jettisonable windows that are assembled separately on a given aircraft structure.

Usually, in a rotary wing aircraft and, more particularly in a helicopter, all windows are implemented as jettisonable emergency windows. If the helicopter comprises e.g. one pilot door window, one co-pilot door window, two sliding door windows and two intermediate windows arranged in-between the sliding door windows and the pilot and co-pilot windows, the helicopter can be provided with six emergency exits in the form of jettisonable emergency windows.

When using such jettisonable emergency windows as emergency exits in rotary wing aircrafts, usually each such emergency window is bonded on a separate window frame. This window frame is then assembled and retained on an associated frame provided on an underlying aircraft fuselage, i.e. on a given airframe structure, only by means of corresponding holding and locking mechanisms. These holding and locking mechanisms are designed to be activated in case of an emergency such that the complete emergency window can be jettisoned, i.e. removed and thrown away, easily and quickly from the given airframe structure in an outward direction.

However, activation of the holding and locking mechanisms must be secured in order to avoid an unintentional and erroneous activation thereof, in particular from crew members and/or passengers of the rotary wing aircraft during flight or on ground. Therefore, each possible misunderstanding with respect to the holding and locking mechanisms has to be taken into account for safety reasons. For instance, it must imperatively be avoided that a crew member and/or passenger may pull up an emergency handle of the holding and locking mechanisms on ground instead of the handle of an aircraft door, as this will unnecessarily activate the holding and locking mechanisms and lead to jettisoning of a jettisonable emergency window, which must subsequently be replaced.

On the other hand, the applicable safety regulations of the European Aviation Safety Agency (EASA) require a predetermined utilization and accessing facility and a specific environment for such an emergency handle of a jettisonable emergency window. More specifically, the emergency handle must be clearly visible, near to adjacent seats and operable with a maximum force of 200 N to jettison and to push out the jettisonable emergency window. However, provision of such a safe and robust jettisonable emergency window is a difficult and complex design task.

Currently, jettisonable emergency windows and associated emergency handles are implemented in various different ways. For instance, a conventional rotatable or translationally movable handle can be used for implementing a given emergency handle, as e.g. described in the document EP 2 626 294 A2. However, in this case utilization of the given emergency handle and the implementation as such would resemble too much to utilization and implementation of a conventional door handle, so that there is an increasing risk of improper use by crew members and/or passengers. Furthermore, integration of an underlying kinematic that is required for such a conventional rotatable or translationally movable handle needs a lot of space and it is not possible to release in several directions, as the handle is operable for release only in a single direction.

Alternatively, removal of a part of the jettisonable emergency window as such can be required for jettisoning the latter in case of an emergency. For instance, a predetermined axle of the jettisonable emergency window can be removable or any other part of the latter. However, such a solution is not compliant to ergonomics and safety rules, in particular the EASA safety regulations, as such a system would generally not be simple and easy to operate, particularly in critical situations such as an aircraft crash and/or ditching. This likewise applies if a given emergency handle is covered by a cover plastic/box, which could potentially further lead to provision of sharp and, thus, potentially dangerous edges.

Still alternatively, a safety wire can be provided for jettisoning the jettisonable emergency window in case of an emergency, as e.g. described in the document DE 202 17 925 U1. However, underlying properties and characteristics of such a safety wire depend on respective ambient temperatures, so that operation of such a safety wire, e.g. by comparatively cold weather, may require forces that are much too high and that may exceed the maximum permissible value of 200 N that is established by the safety regulations of the EASA.

Finally, pyrotechnical means can be provided for jettisoning the jettisonable emergency window in case of an emergency. However, use of such pyrotechnical means is generally too dangerous for civil applications and, thus, not adapted for civil certification. Furthermore, explosion of such pyrotechnical means under water, i.e. after ditching, is very dangerous.

Other jettisonable emergency windows are likewise known. By way of example, the document US 2012/0085033 A1 describes a jettisonable emergency window that can be jettisoned in case of an emergency by means of a pressure source acting on an inflatable seal. The document U.S. Pat. No. 4,102,011 describes an aircraft door that is adapted to pivot about a pair of vertical hinges, which are detachably fixed to an associated door frame by a secondary joint provided at each hinge, wherein retraction of a short horizontal pin provided at each secondary joint releases the door for jettison. The document U.S. Pat. No. 8,826,597 describes a sealed framework for secured jettisoning of a detachable panel. The document U.S. Pat. No. 6,027,073 describes a window frame for a helicopter that is intended to fix an emergency window onto a support, wherein the window frame includes cutting out means that are driven by pulling on at least a part of the window perimeter in order to divide a section of the frame at least into two parts and, thus, to detach the window frame from the support. The document U.S. Pat. No. 3,851,845 describes an aperture closure device incorporating a quick release mechanism to effect jettisoning of an aircraft door that is provided with the device in case of an emergency, wherein the device includes a plurality of separable hinges operated by means of a single lever from within the aircraft, which can further incorporate means for simultaneously releasing a provided normal door closing mechanism, so that effecting complete release of the aperture closure device by operation of the single lever can be achieved.

The document U.S. Pat. No. 5,826,824 in turn describes an emergency egress system that is designed for facilitating emergency egress of passengers and/or crew members from a helicopter. This egress system includes an egress panel that is implemented by a cockpit window as a jettisonable emergency window and that is accommodated in an associated panel frame, which is implemented by a fuselage of the helicopter and, thus, represents a fuselage frame. Furthermore, a weather strip defines back-to-back channels for accepting the peripheral edges of the jettisonable emergency window and the fuselage frame. Moreover, the emergency egress system includes a plurality of retention devices disposed about the periphery of the jettisonable emergency window for laterally retaining the latter with respect to the fuselage frame in a normal operating mode, a cam operative to forcibly urge a portion of the weather strip out of engagement with one of the peripheral edges and an actuating device operative to sequentially disengage at least one of the retention devices and actuate the cam case of an emergency in a corresponding emergency operating mode. Following actuation, a passenger and/or crew member may detach the jettisonable emergency window from the fuselage frame.

However, while at least a part of the above described jettisonable emergency windows comprises comparatively heavy and bulky holding and locking mechanisms with multiple rods and springs, others are prone to unintentional and erroneous activation. Furthermore, at least a part of the above described jettisonable emergency windows is comparatively difficult to access and operate, while others are cumbersome and complicated in use. Moreover, if an emergency handle is provided, it has a predetermined, fixed movement direction at a predetermined, fixed movement position, which is not suitable for use in case of an emergency, e.g. by night and/or by disoriented people, such as after ditching or unlocking of corresponding safety belts.

BRIEF SUMMARY OF THE INVENTION

It is, therefore, an object of the present invention to provide a new jettisonable emergency exit for a vehicle, in particular for an aircraft and, more particularly, for a rotary wing aircraft such as a helicopter, that has a reduced weight, is protected against an unintentional and erroneous jettison, and that is easy and safely operable. This object is solved by a jettisonable emergency exit having the features of claim 1.

More specifically, according to the present invention a jettisonable emergency exit for a vehicle comprises an outer peripheral edge that is adapted to be accommodated in an associated frame provided in a vehicle. At least one emergency exit retention means and at least one emergency exit locking device are integrated into the outer peripheral edge. The at least one emergency exit retention means comprises at least one non-retractable pivot finger around which the jettisonable emergency exit is rotatable in an emergency mode, and the at least one emergency exit locking device comprises at least one locking hook that is adapted for locking the jettisonable emergency exit in an associated locking position in normal operation mode and for releasing the jettisonable emergency exit in an associated retracted position in the emergency mode. The at least one locking hook is retractable from the associated locking position into the associated retracted position by means of an emergency exit activation strap.

Advantageously, the jettisonable emergency exit according to the present invention is as integrated component, wherein all parts are implemented and integrated onto the jettisonable emergency exit itself. In other words, all emergency exit retention means, emergency exit locking devices, emergency exit activation straps and associated activation handles are provided on the jettisonable emergency exit as such. Thus, the complete jettisonable emergency exit is designed as an exchangeable and replaceable component.

According to one aspect of the present invention, the emergency exit activation strap is made of polyamide 6 (or PA6) and, preferably, implemented as a nylon strap (or band or bandage) that can be pulled in an arbitrary direction for retracting the at least one locking hook from the associated locking position into the associated retracted position. In other words, the nylon strap can be pulled in each and every direction, i.e. towards the top, towards an operator, towards the rear or the front of the vehicle and so on. It is just enough to seize or grasp an associated activation handle and to draw, as the nylon strap provides these degrees of freedom during operation.

Advantageously, by using such a nylon strap, a mechanical actuation can be implemented with a life duration that is practically not limited. More specifically, the nylon strap directly acts on the at least one locking hook that fixes the jettisonable emergency exit in the associated frame provided in the vehicle instead of deforming or cutting an associated elastomeric joint that maintains the jettisonable emergency exit on the associated frame. Thus, a required effort is calibrated and not dependent on an ambient temperature, for example.

Preferably, two activation straps are provided that are respectively made of polyamide 6 (or PA6) and, preferentially, implemented as nylon straps (or bands or bandages). These two straps are independent of each other so that each one can by operated independent on the other one. Furthermore, in order to increase the safety, there is a step in which each strap extends without effect before acting on the at least one locking hook. Moreover, each one of the two straps is preferably attached to a separate activation handle. More specifically, each strap can be connected to a mechanism in order to create retraction of the at least one locking hook. After that, the jettisonable emergency exit can move easily outside the vehicle due to rotation around the non-retractable pivot finger that is preferably installed on an upper side of the window frame.

Advantageously, by using such straps, an overall weight of the jettisonable emergency exit can be reduced. Furthermore, a safe and reliable release in case of an emergency can be achieved, whatever the external conditions are, e.g. from −35° C. up to 70° C., under water, in salt conditions and so on. Furthermore, the jettisonable emergency exit is reusable and allows checking thereof at the final assembly line (FAL) or during a maintenance visit.

According to one aspect of the present invention, each jettisonable emergency exit is provided with three emergency exit locking devices, each one comprising an associated locking hook. Two of these emergency exit locking devices are preferentially arranged at a first edge of the jettisonable emergency exit, while the third emergency exit locking device is arranged on a second edge thereof. Each locking hook preferentially comprises a specific gravity rotation avoidance roller in order to avoid some rotations per gravity in operation of the vehicle. Preferably, the jettisonable emergency exit is further provided with two emergency exit retention means, each one comprising a non-retractable pivot finger, wherein both such emergency exit retention means are arranged on a third edge of the jettisonable emergency exit.

Preferably, the jettisonable emergency exit according to the present invention comprises two seals in order to block displacements along X and Z direction after assembly on the associated frame provided in the vehicle, and also to assure water and airtightness. Furthermore, according to one aspect of the present invention, the emergency exit retention device locks the jettisonable emergency exit on the associated frame in the Y direction. However, during opening/releasing and jettisoning or ejection of the jettisonable emergency exit, the latter preferably rotates along the X direction in order to allow the translation along the Y direction for jettison, i.e. ejection.

According to a preferred embodiment of the invention, the emergency exit activation strap comprises synthetic fibers that are based on polyamide.

According to a further preferred embodiment of the invention, the emergency exit activation strap comprises nylon.

According to a further preferred embodiment of the invention, a first emergency exit locking device with a first locking hook is provided at a first section of the outer peripheral edge, and a second emergency exit locking device with a second locking hook is provided at a second section of the outer peripheral edge. The first and second locking hooks are connected to the emergency exit activation strap.

According to a further preferred embodiment of the invention, the first and second sections are arranged in a predetermined angle at the outer peripheral edge with respect to each other. This predetermined angle preferably amounts to at least approximately 90°.

According to a further preferred embodiment of the invention, a third emergency exit locking device with a third locking hook is provided at the second section of the outer peripheral edge.

According to a further preferred embodiment of the invention, the third locking hook is connected to the emergency exit activation strap.

According to a further preferred embodiment of the invention, the at least one locking hook is rotatable by means of the emergency exit activation strap.

According to a further preferred embodiment of the invention, the emergency exit activation strap is attached to at least one activation handle. The at least one activation handle is manually movable from an initial position defined by an associated handle holder into a first intermediate position by applying an initial release force and is further manually movable from the first intermediate position into a second intermediate position by applying a first traction force, and from the second intermediate position into a release position by applying a second traction force. The second traction force is greater than the first traction force. The at least one locking hook is retracted into the associated retracted position when the at least one activation handle is in the release position.

According to a further preferred embodiment of the invention, the at least one activation handle defines an inner activation handle and at least one other activation handle is provided. The at least one other activation handle defines an outer activation handle. The inner and outer activation handles are arranged on opposed sides of the jettisonable emergency exit.

According to a further preferred embodiment of the invention, the outer activation handle is releasable by means of an associated release element for movement from an initial position into a first intermediate position. The outer activation handle is manually movable from the first intermediate position into a second intermediate position by applying a first traction force, and from the second intermediate position into a release position by applying a second traction force. The second traction force is greater than the first traction force. The at least one locking hook is retracted into the associated retracted position when the outer activation handle is in the release position.

According to a further preferred embodiment of the invention, the at least one locking hook is retractable from the associated locking position into the associated retracted position by means of another emergency exit activation strap. The other emergency exit activation strap is attached to the outer activation handle.

According to a further preferred embodiment of the invention, the at least one emergency exit retention means and the at least one emergency exit locking device are adapted to allow a rotation of the jettisonable emergency exit in the emergency mode prior to a translational ejection movement of the jettisonable emergency exit. The translational ejection movement is performable in a plane defined by the jettisonable emergency exit.

According to a further preferred embodiment of the invention, at least one gravity retraction avoidance roller is provided. The at least one gravity retraction avoidance roller is adapted for avoiding unintentional gravity-based retraction of the at least one locking hook from the associated locking position into the associated retracted position.

According to a further preferred embodiment of the invention, the jettisonable emergency exit is configured as a vehicle window, wherein the outer peripheral edge defines an associated window frame.

The present invention further provides a method of releasing a jettisonable emergency exit for ejection from an associated vehicle. The method comprises at least the steps of moving an activation handle of the jettisonable emergency exit from an initial position into a first intermediate position, manually moving the activation handle from the first intermediate position into a second intermediate position by applying a first traction force, and manually moving the activation handle from the second intermediate position into a release position by applying a second traction force. The second traction force is greater than the first traction force and the jettisonable emergency exit is ready for ejection from the associated vehicle when the activation handle is in the release position.

More specifically, according to one aspect of the present invention the method of releasing a jettisonable emergency exit for ejection from an associated vehicle requires the performance of a sequence of at least three separate steps before jettisoning, i.e. ejection of the jettisonable emergency exit is possible: in a first step, the activation handle must be released or ejected; in a second step, the activation handle must be pulled until complete rolling out or releasing of a corresponding emergency exit activation strap that is attached to the activation handle; and in a third step, after complete rolling out of the corresponding emergency exit activation strap, the activation handle must be pulled stronger than in the second step in order to unblock corresponding locking hooks in order to completely release the jettisonable emergency exit, which can thus be jettisoned, i.e. ejected.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 3 shows an exemplary jettisoning process according to the present invention with respect to the board side sliding door window emergency exit of FIG. 2, FIG. 15 shows a method of releasing the board side passenger window emergency exit of FIG. 2 for ejection from an associated vehicle using an outer activation handle.

DETAILED DESCRIPTION OF THE INVENTION

Figure 1:
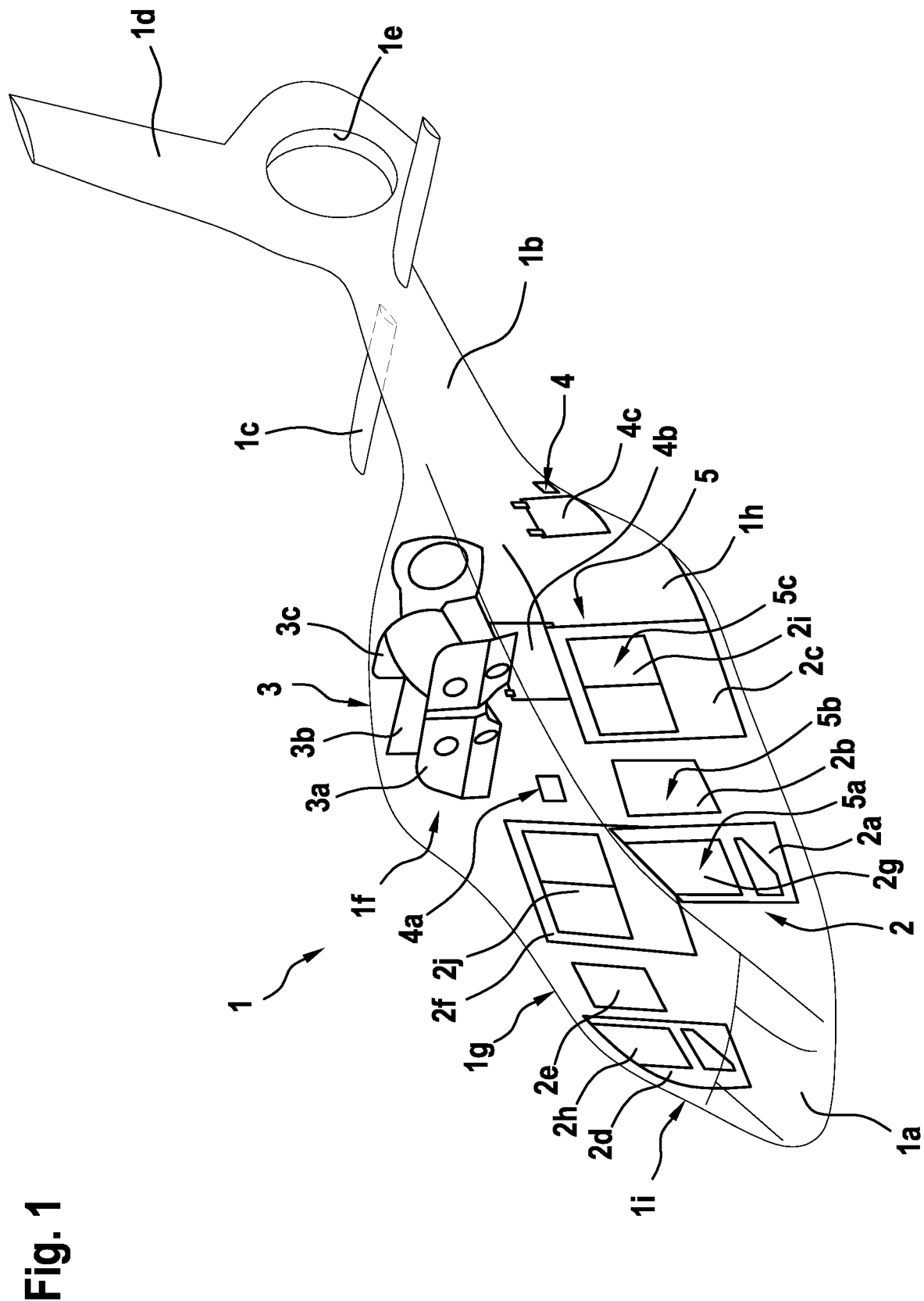
FIG. 1 shows a schematic view of a vehicle that is adapted to receive a jettisonable emergency exit according to the present invention.

FIG. 1 shows a vehicle 1 that is exemplarily illustrated as an aircraft, in particular as a rotary wing aircraft and, more particularly, as a helicopter. Thus, for purposes of simplicity and clarity, the vehicle 1 is hereinafter referred to as the "helicopter" 1. The present invention is, however, not limited to helicopters and can likewise be applied to any other vehicle, in particular to a vehicle that is controllable in a flowing medium, such as air or water, independent of a particular configuration thereof.

Illustratively, the helicopter 1 comprises a fuselage 1a that defines a tail boom 1b, which exemplarily comprises a tail wing 1c, a vertical tail plane 1d, which is also referred to hereinafter as the "fin 1d", and a shroud 1e for accommodation of a suitable counter-torque device, such as a tail rotor, which is configured to provide counter-torque during operation in order to balance the helicopter 1 in terms of yaw. The tail boom 1b may further be provided e.g. with a horizontal stabilizer, a bumper and so on.

It should be noted that only the fuselage 1a with the tail boom 1b are shown in FIG. 1 for purposes of simplicity and clarity of the drawings. However, other conventional components, such as e.g. a rotor and a landing gear of the helicopter 1, are not shown, as they are well-known to the person skilled in the art and not part of the present invention and would, thus, only unnecessarily encumber and complicate the representation.

Illustratively, the fuselage 1a comprises at least two longitudinal side walls, a board side shell 1h, which is also referred to hereinafter as the "board side wall 1h", and a starboard side shell 1i, which is also referred to hereinafter as the "starboard side wall 1i", both of which are preferably connected to the tail boom 1b. The board side wall 1h and the starboard side wall 1i are exemplarily equipped with a plurality of doors and/or windows 2. By way of example, the board side wall 1h is equipped with a co-pilot door 2a having a co-pilot door window 2g, a board side passenger window 2b and a board side sliding door arrangement 2c having a board side sliding door window 2i, and the starboard side wall 1i is equipped with a pilot door 2d having a pilot door window 2h, a starboard side passenger window 2e and a starboard side sliding door arrangement 2f having a starboard side sliding door window 2j.

The fuselage 1a illustratively further comprises an outer surface 1g and preferably defines at least a drive system accommodating region 1f and a cockpit, and may further define a passenger cabin and/or a cargo compartment. However, for simplicity and conciseness of the description, such a cockpit, passenger cabin and cargo compartment are not explained in greater detail.

The drive system accommodating region 1f preferably accommodates one or more engines that are adapted for driving the helicopter 1, e.g. by providing power to an associated power distribution unit, such as a gearbox, which then provides this power to a suitable propelling unit, such as e.g. a propeller, rotor or other. Preferably, the one or more engines are embodied as air breathing propulsion engines, such as diesel engines, gas engines, gas turbines and so on, which combust a fuel/air mix for power generation. As all such air breathing propulsion engines generate heat, the drive system accommodating region 1f is equipped with at least one firewall arrangement 3 that defines a fire-resistant separation between the air breathing propulsion engines and remaining parts of the fuselage 1a. The at least one firewall arrangement 3 exemplarily comprises a front firewall 3a, a mid firewall 3b and a rear firewall 3c. The firewall arrangement 3 is, nevertheless, not limited to such a configuration and may also comprise more or less firewalls and/or additional components. However, as the air breathing propulsion engines and the firewall arrangement 3 as such are not part of the present invention, they are not explained in greater detail for brevity and conciseness.

Illustratively, the fuselage 1a and, more generally the helicopter 1, is further provided with a plurality of maintenance trapdoors 4. By way of example, the plurality of maintenance trapdoors 4 comprises two starboard side traps 4a, 4b and one board side trap 4c. However, as the plurality of maintenance trapdoors 4 as such are not part of the present invention, they are also not explained in greater detail for brevity and conciseness.

According to one aspect of the present invention, the fuselage 1a and, more generally the helicopter 1, is further provided with a plurality of jettisonable emergency exits 5. Illustratively, the jettisonable emergency exits 5 comprise a jettisonable co-pilot door window emergency exit 5a, a jettisonable board side passenger window emergency exit 5b and a jettisonable board side sliding door window emergency exit 5c. The jettisonable emergency exits 5a, 5b, 5c are respectively defined by the co-pilot door window 2g, the board side passenger window 2b and the board side sliding door window 2i.

However, the jettisonable emergency exits 5 are not limited to the illustrated jettisonable emergency exits 5a, 5b, 5c. Instead, more or less jettisonable emergency exits can be provided. In particular, it should be noted that only a part of all preferred jettisonable emergency exits is labelled for simplicity and clarity of the drawings and that, e.g. the pilot door window 2h, the starboard side passenger window 2e and the starboard side sliding door window 2j may likewise define jettisonable emergency exits, and preferably define such jettisonable emergency exits.

Figure 2:
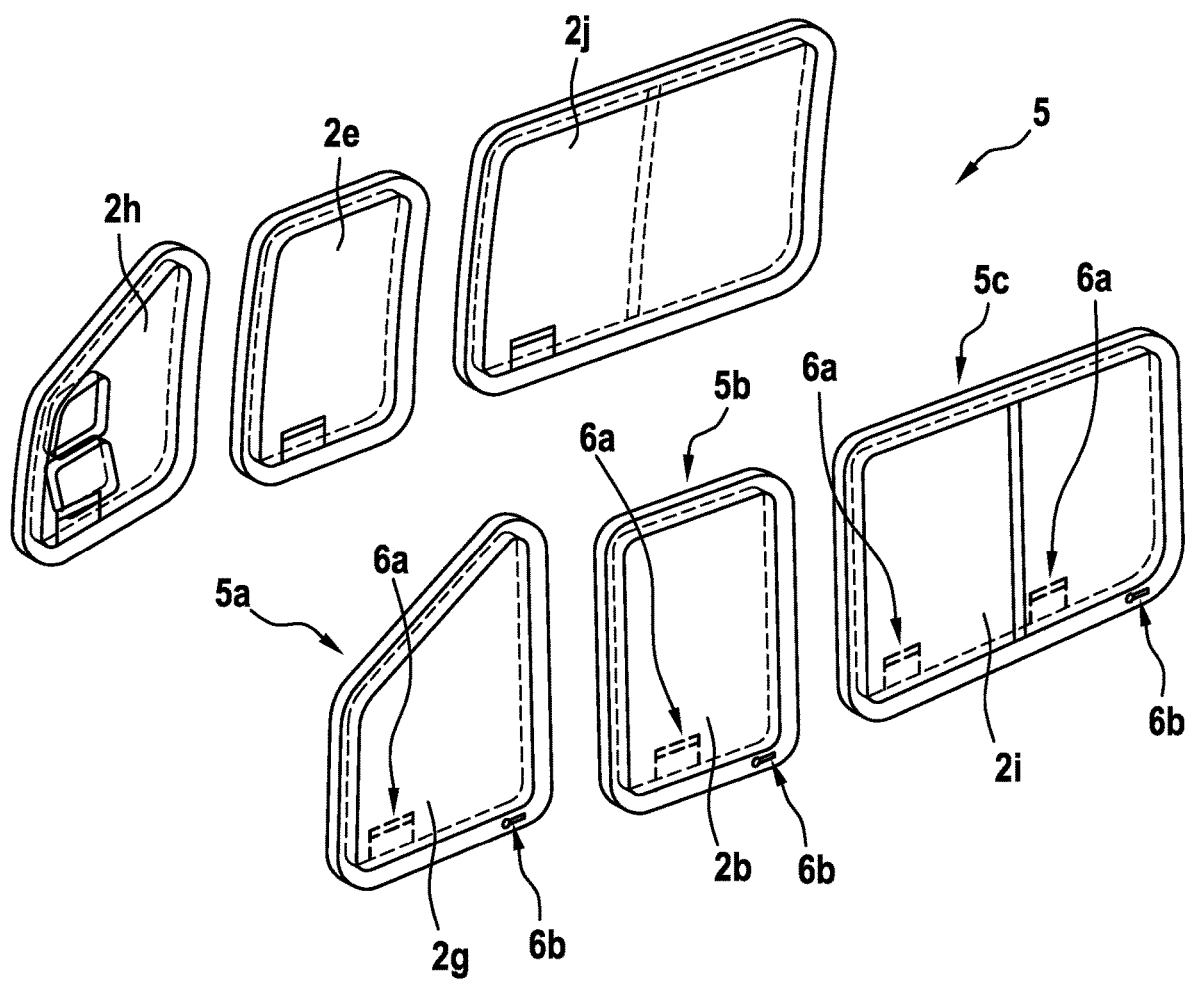
FIG. 2 shows an exploded perspective view of the jettisonable emergency exits of FIG. 1.

FIG. 2 shows the co-pilot door window 2g, the board side passenger window 2b, the board side sliding door window 2i, the pilot door window 2h, the starboard side passenger window 2e and the starboard side sliding door window 2j of FIG. 1. As described above, the windows 2g, 2b, 2i define the jettisonable emergency exits 5a, 5b, 5c of FIG. 1.

According to one aspect of the present invention, each one of the jettisonable emergency exits 5a, 5b, 5c is provided with at least one inner emergency exit activating system 6a and preferably further comprises at least one outer emergency exit activating system 6b. By way of example, the jettisonable emergency exits 5a, 5b are respectively provided with a single inner emergency exit activating system 6a and a single outer emergency exit activating system 6b, while the jettisonable emergency exit 5c is provided with two inner emergency exit activating systems 6a and a single outer emergency exit activating system 6b.

FIG. 3 shows an exemplary ejection of the jettisonable emergency exit 5c of FIG. 1 and FIG. 2, which is defined by the board side sliding door window 2i of FIG. 2, from the board side sliding door arrangement 2c of FIG. 1, e.g. in case of an emergency. Illustratively, the board side sliding door window 2i has a lower edge 7a, an upper edge 7b and lateral edges 7c, and is accommodated and retained in an associated board side sliding door frame 2l provided by means of the board side sliding door arrangement 2c.

As illustrated in part (A) of FIG. 3, either the inner emergency exit activating system 6a or the outer emergency exit activating system 6b of FIG. 2 is initially activated for releasing the jettisonable emergency exit 5c from the board side sliding door arrangement 2c. Release of a jettisonable emergency exit according to the present invention is performed according to a release method that is described in more detail below by way of example with reference to FIG. 14 and FIG. 15.

As illustrated in part (B) of FIG. 3, after having released the jettisonable emergency exit 5c, the latter is first pivoted outwardly from the fuselage 1a of FIG. 1 by means of a rotational opening movement, around an axis that is at least approximately parallel to the upper edge 7b, as illustrated with an arrow 8a. This is preferably achieved by manually pulling or pushing the lower edge 7a in the direction of the arrow 8a.

As illustrated in part (C) of FIG. 3, after having pivoted the jettisonable emergency exit 5c in direction of the arrow 8a, a translational ejection movement is performed, wherein the jettisonable emergency exit 5c is moved in a plane that is defined by the jettisonable emergency exit 5c. Illustratively, this translational ejection movement is performed in direction of an arrow 8b. Thus, the jettisonable emergency exit 5c, i.e. the board side sliding door window 2i, can entirely be removed from the board side sliding door arrangement 2c and, consequently, be jettisoned.

Figure 4:
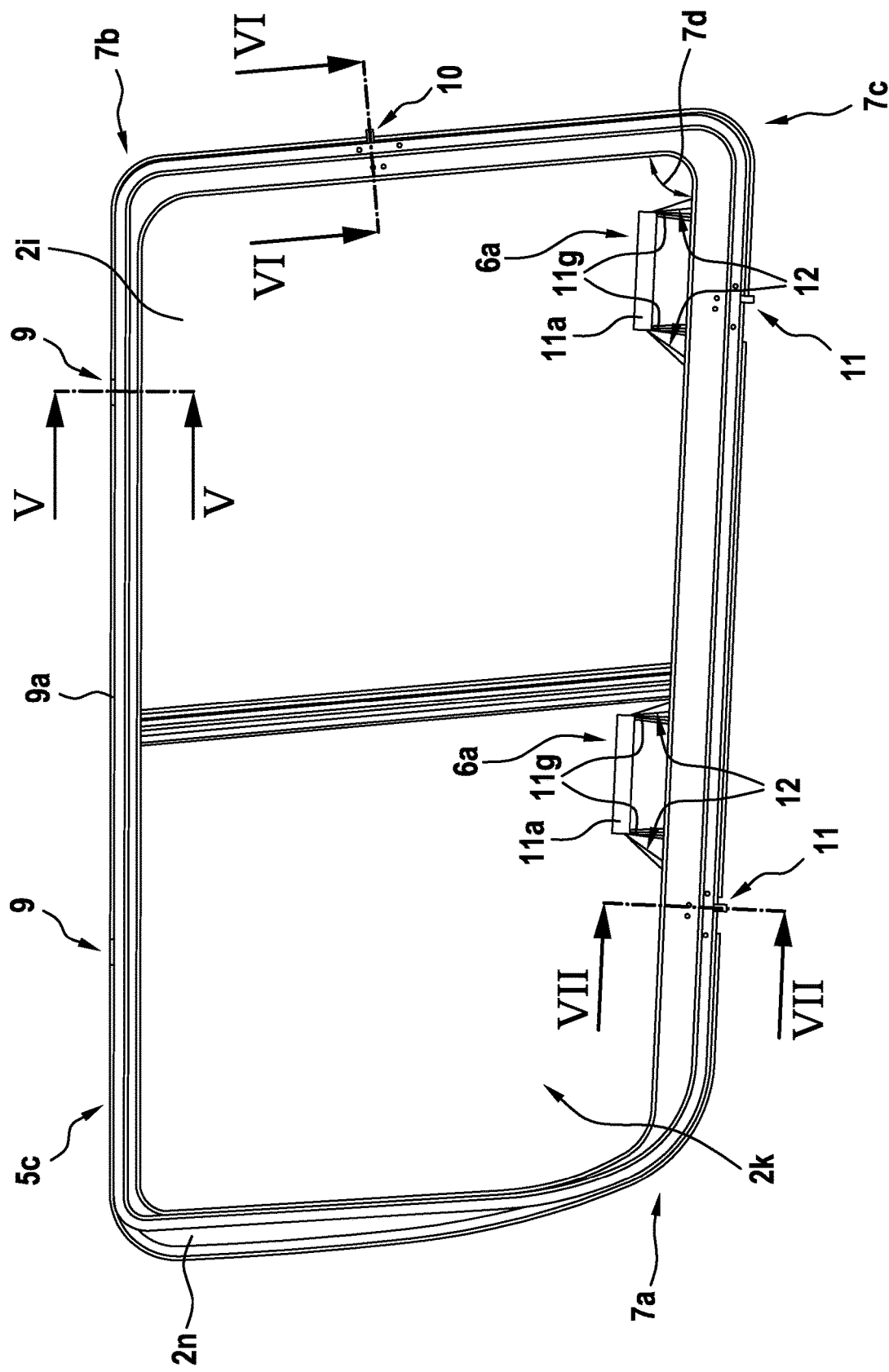
FIG. 4 shows a side view of an inner side of the board side sliding door window emergency exit of FIG. 2.

FIG. 4 shows the jettisonable emergency exit 5c of FIG. 1 and FIG. 2, which is defined by the board side sliding door window 2i of FIG. 2 that illustratively comprises a window pane 2k. The jettisonable emergency exit 5c is exemplarily illustrated as seen from the inside of the fuselage 1a of the helicopter 1 of FIG. 1.

Preferably, the jettisonable emergency exit 5c comprises an outer peripheral edge 2n that is adapted to be accommodated in an associated frame provided in a vehicle and, in the described example, in the associated board side sliding door frame 2l of FIG. 3 that is provided in the board side sliding door arrangement 2c of the helicopter 1 of FIG. 1. According to one aspect of the present invention, at least one emergency exit retention means 9 and at least one emergency exit locking device 10, 11 are integrated into the outer peripheral edge 2n of the jettisonable emergency exit 5c. Preferably, the at least one emergency exit retention means 9 is adapted to allow the rotational movement of the jettisonable emergency exit 5c in the direction of the arrow 8a according to part (B) of FIG. 3 in an emergency mode. The at least one emergency exit locking device 10, 11 is preferably adapted for locking the jettisonable emergency exit 5c in an associated locking position in normal operation mode, which is similar to what is illustrated in part (A) of FIG. 3, and for releasing the jettisonable emergency exit 5c in the emergency mode upon activation, as illustrated in parts (B) and (C) of FIG. 3.

By way of example, the jettisonable emergency exit 5c comprises two retention means 9, a single lateral locking device 10 and two lower locking devices 11. Preferably, the lateral locking device 10 is provided at a first section of the outer peripheral edge 2n of the jettisonable emergency exit 5c, which is exemplarily defined by one of the lateral window edges 7c, and at least one and, illustratively, both lower locking devices 11 are provided at a second section of the outer peripheral edge 2n, which is exemplarily defined by the lower window edge 7a. The first and second sections are arranged in a predetermined angle 7d at the outer peripheral edge 2n with respect to each other, which preferably amounts to at least approximately 90°, but which more preferably is at least comprised in a range between 80° and 100°.

Furthermore, at least one and, illustratively, both retention means 9 are preferably provided at a third section of the outer peripheral edge 2n, which is exemplarily defined by the upper window edge 7b. The first and third sections are also arranged in a predetermined angle at the outer peripheral edge 2n with respect to each other, which preferably also amounts to at least approximately 90°, but which more preferably is at least comprised in a range between 80° and 100°.

While the two retention means 9 cannot be activated and, thus, are static components, the three locking devices 10, 11, i.e. the single lateral locking device 10 and the two lower locking devices 11, can be activated by means of an emergency exit activation strap (or band or bandage) 12 via the inner emergency exit activating system 6a of FIG. 2 or the outer emergency exit activating system (6b in FIG. 2) for releasing the jettisonable emergency exit 5c from the board side sliding door arrangement 2c as described above with reference to FIG. 3. In other words, preferably all three locking devices 10, 11 are collectively connected to at least one emergency exit activation strap 12.

Preferentially, the at least one emergency exit activation strap 12 comprises synthetic fibers that are based on polyamide. More specifically, the at least one emergency exit activation strap 12 comprises polyamide 6 (or PA6) and, more preferably, nylon.

According to one aspect of the present invention, the three locking devices 10, 11 are connected to activation handles 11a (and 11e in FIG. 10) of the inner emergency exit activating system 6a of FIG. 2 and/or the outer emergency exit activating system (6b of FIG. 2 and in FIG. 10) via the at least one emergency exit activation strap 12. While both systems can be connected to a single emergency exit activation strap, preferably the activation handle 11a of the inner emergency exit activating system 6a is attached to a first emergency exit activation strap 12 and the activation handle (11e in FIG. 10) of the outer emergency exit activating system (6b in FIG. 10) is attached to a second emergency exit activation strap 12. Furthermore, the inner and outer activation handles 11a (and 11e in FIG. 10) are preferably arranged on opposed sides of the jettisonable emergency exit 5c, such that the inner activation handle 11a is preferentially accessible from inside of the fuselage 1a of the helicopter 1 of FIG. 1, while the outer activation handle (11e in FIG. 10) is preferentially accessible from the outside thereof. In the illustrated example, two inner activation handles 11a are provided, each of which is preferably attached to the same (first) emergency exit activation strap 12 and retained in an associated handle holder 11g.

Figure 5:
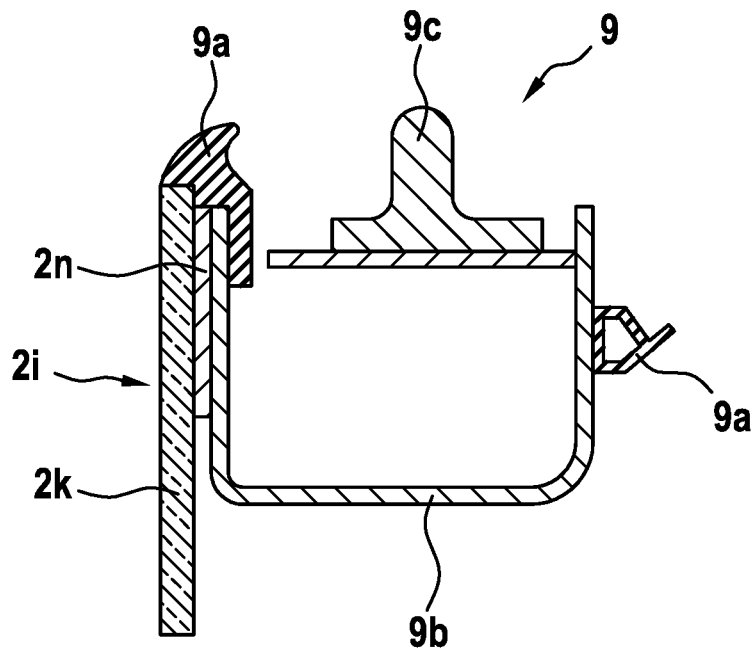
FIG. 5 shows a sectional view of an emergency exit retention device of FIG. 4.

FIG. 5 shows one of the two retention means 9 of FIG. 4 representatively for both retention means 9 of FIG. 4. As described above with reference to FIG. 4, the retention means 9 is integrated into the outer peripheral edge 2n of the jettisonable emergency exit 5c and preferably comprises at least one support 9b, which is illustratively U-shaped in cross section. The at least one support 9b is preferably connected to two window seals 9a, which are adapted for providing a double sealing of the jettisonable emergency exit 5c with respect to the associated board side sliding door frame 2l of FIG. 3 that is provided in the board side sliding door arrangement 2c of the helicopter 1 of FIG. 1, with respect to water- and airtightness.

According to one aspect of the present invention, the retention means 9 comprises at least one non-retractable pivot finger 9c around which the jettisonable emergency exit 5c is rotatable in an emergency mode, as illustrated in part (B) of FIG. 3. The at least one non-retractable pivot finger 9c is preferably mounted to the at least one support 9b and has an at least slightly curved cross section that is adapted to facilitate the rotational opening movement 8a described above with reference to FIG. 3.

Figure 6:
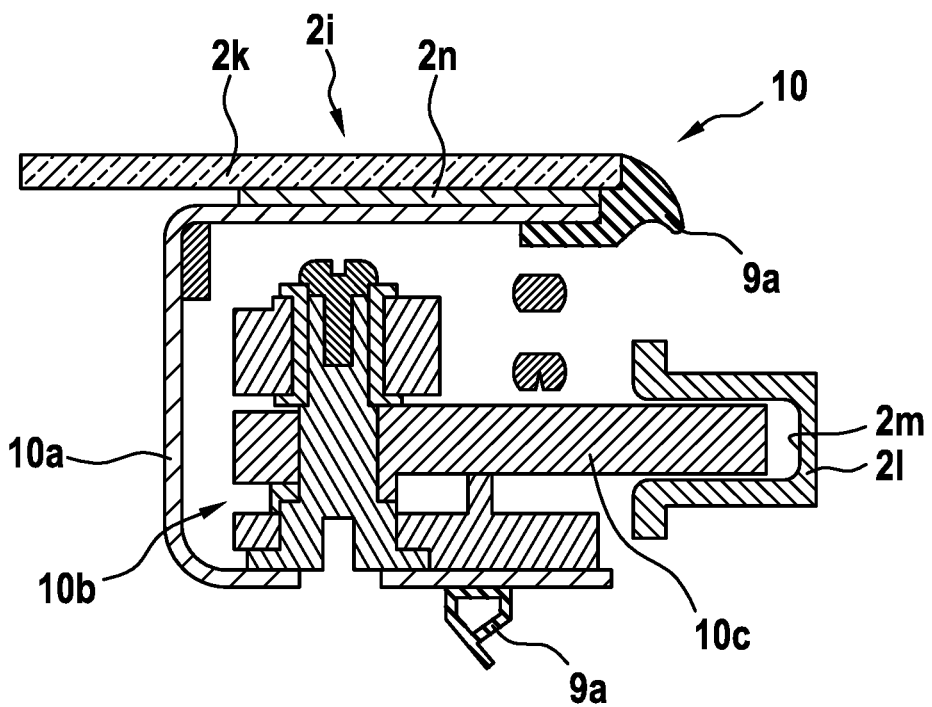
FIG. 6 shows a sectional view of an emergency exit lateral locking device of FIG. 4.

FIG. 6 shows the lateral locking device 10 of FIG. 4. As described above with reference to FIG. 4, the lateral locking device 10 is integrated into the outer peripheral edge 2n of the jettisonable emergency exit 5c and preferably comprises at least one support 10a, which is illustratively U-shaped in cross section. The at least one support 10a is preferably connected to the two window seals 9a of FIG. 5.

According to one aspect of the present invention, the lateral locking device 10 comprises at least one locking hook 10c that is adapted for interacting with the lower locking devices 11 of FIG. 4 in order to lock the jettisonable emergency exit 5c in an associated locking position in normal operation mode, similar to what is shown in part (A) of FIG. 3, and for interacting with the lower locking devices 11 of FIG. 4 in order to release the jettisonable emergency exit 5c in an associated retracted position in the emergency mode, as illustrated in parts (B) and (C) of FIG. 3. The at least one locking hook 10c is preferably retractable from the associated locking position into the associated retracted position by means of the emergency exit activation strap 12 of FIG. 4.

More specifically, the at least one locking hook 10c is preferably pivotally mounted to the at least one support 10a and, thus, retractable by means of a rotation in a plane that is at least approximately parallel to a plane defined by the jettisonable emergency exit 5c. Therefore, the at least one locking hook 10c is mounted to associated rotating means 10b that are adapted for allowing rotation of the at least one locking hook 10c, which is also referred to as the lateral locking hook 10c hereinafter.

It should be noted that the lateral locking device 10 is exemplarily illustrated in FIG. 6 in its locking position, i.e. the normal operation mode of the jettisonable emergency exit 5c. Accordingly, the at least one locking hook 10c engages a frame groove 2m that is preferably embodied in the associated board side sliding door frame 2l of FIG. 3 that is provided in the board side sliding door arrangement 2c of the helicopter 1 of FIG. 1. In the emergency mode of the jettisonable emergency exit 5c, the at least one locking hook 10c is retracted from the frame groove 2m by means of a rotational movement that is induced by the emergency exit activation strap 12 of FIG. 4 and can, thus, no more block the rotational and translational movements of the jettisonable emergency exit 5c as illustrated in parts (B) and (C) of FIG. 3.

It should be noted that a rotational movement of the at least one locking hook 10c is described above as a preferred movement thereof. However, other movements such as longitudinal movements can likewise be implemented and are, thus, considered as being part of the present invention.

Figure 7:
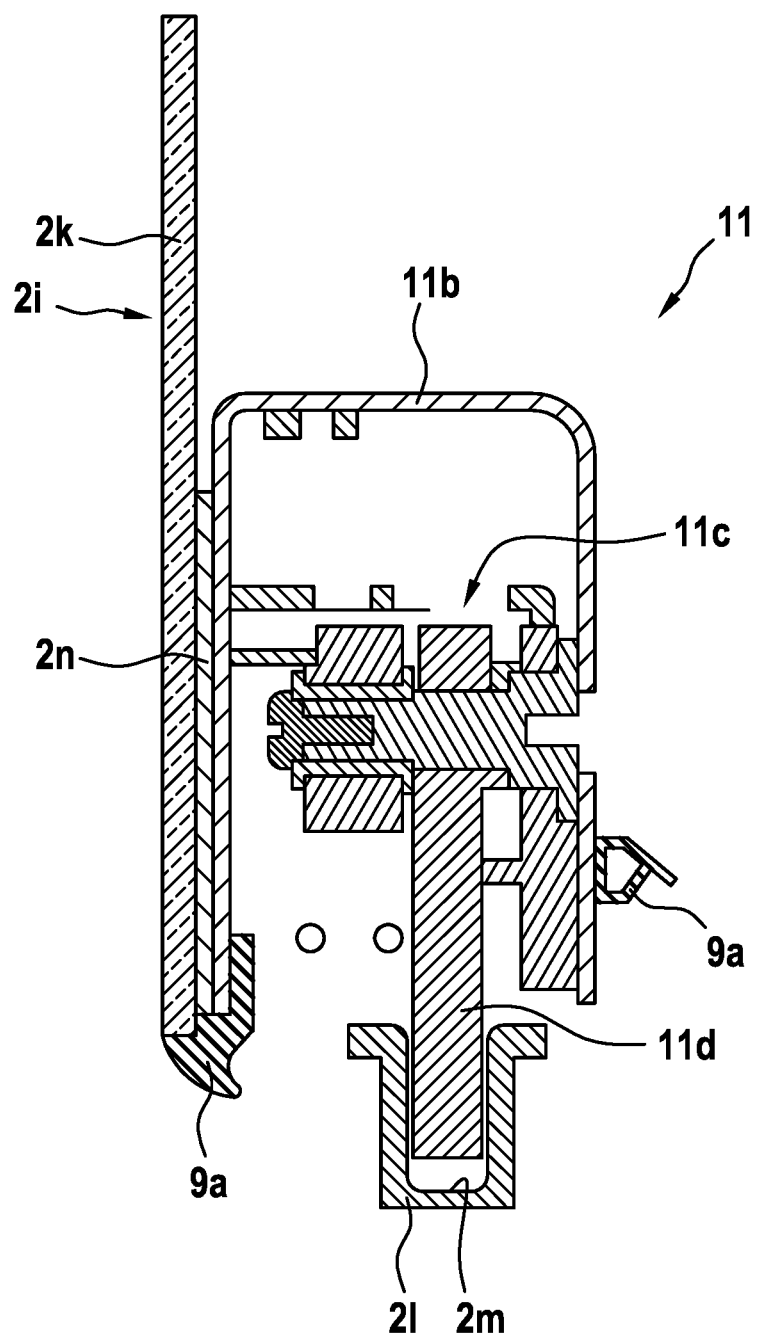
FIG. 7 shows a sectional view of an emergency exit lower locking device of FIG. 4.

FIG. 7 shows one of the two lower locking devices 11 of FIG. 4 representatively for both lower locking devices of FIG. 4. As described above with reference to FIG. 4, the lower locking device 11 is integrated into the outer peripheral edge 2n of the jettisonable emergency exit 5c and preferably comprises at least one support 11b, which is illustratively U-shaped in cross section. The at least one support 11b is preferably connected to the two window seals 9a of FIG. 5.

According to one aspect of the present invention, the lower locking device 11 comprises at least one locking hook 11d that is adapted for interacting with the locking hook 10c of the lateral locking device 10 of FIG. 6 in order to lock the jettisonable emergency exit 5c in an associated locking position in normal operation mode, similar to what is shown in part (A) of FIG. 3, and for interacting with the locking hook 10c of the lateral locking device 10 of FIG. 6 in order to release the jettisonable emergency exit 5c in an associated retracted position in the emergency mode, as illustrated in parts (B) and (C) of FIG. 3. The at least one locking hook 11*d* is preferably retractable from the associated locking position into the associated retracted position by means of the emergency exit activation strap 12 of FIG. 4.

More specifically, the at least one locking hook 11*d* is preferably pivotally mounted to the at least one support 11*b* and, thus, retractable by means of a rotation in a plane that is at least approximately parallel to a plane defined by the jettisonable emergency exit 5*c*. Therefore, the at least one locking hook 11*b* is mounted to associated rotating means 11*c* that are adapted for rotating the at least one locking hook 11*d*, which is also referred to as the lower locking hook 11*d* hereinafter.

It should be noted that the lower locking device 11 is exemplarily illustrated in FIG. 7 in its locking position, i.e. the normal operation mode of the jettisonable emergency exit 5*c*. Accordingly, the at least one locking hook 11*d* engages the frame groove 2*m* of FIG. 6. In the emergency mode of the jettisonable emergency exit 5*c*, the at least one locking hook 11*d* is retracted from the frame groove 2*m* by means of a rotational movement that is induced by the emergency exit activation strap 12 of FIG. 4 and can, thus, no more block the rotational and translational movements of the jettisonable emergency exit 5*c* as illustrated in parts (B) and (C) of FIG. 3.

It should be noted that a rotational movement of the at least one locking hook 11*d* is described above as a preferred movement thereof. However, other movements such as longitudinal movements can likewise be implemented and are, thus, considered as being part of the present invention. It should further be noted that the frame groove 2*m* can be embodied as a peripheral groove in the associated board side sliding door frame 2*l* of FIG. 3 that is provided in the board side sliding door arrangement 2*c* of the helicopter 1 of FIG. 1. However, alternatively the frame groove 2*m* can be divided in segments that are respectively assigned to the two retention means 9, a single lateral locking device 10 and two lower locking devices 11 of FIG. 4.

Figure 8:
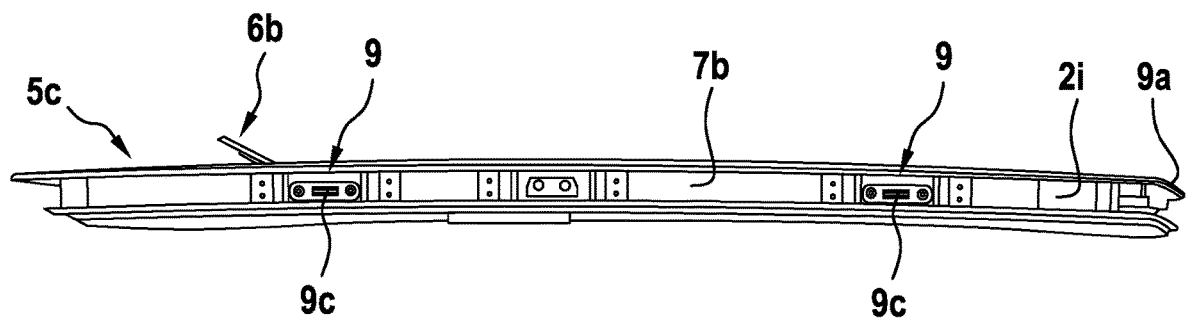
FIG. 8 shows a plan view of the board side sliding door window emergency exit of FIG. 2.

FIG. 8 shows the upper edge 7*b* of the jettisonable emergency exit 5*c* of FIG. 4, for further illustrating the two retention means 9 with the non-retractable pivot fingers 9*c*. FIG. 8 also exemplifies the outer emergency exit activating system 6*b* of FIG. 2.

Figure 9:
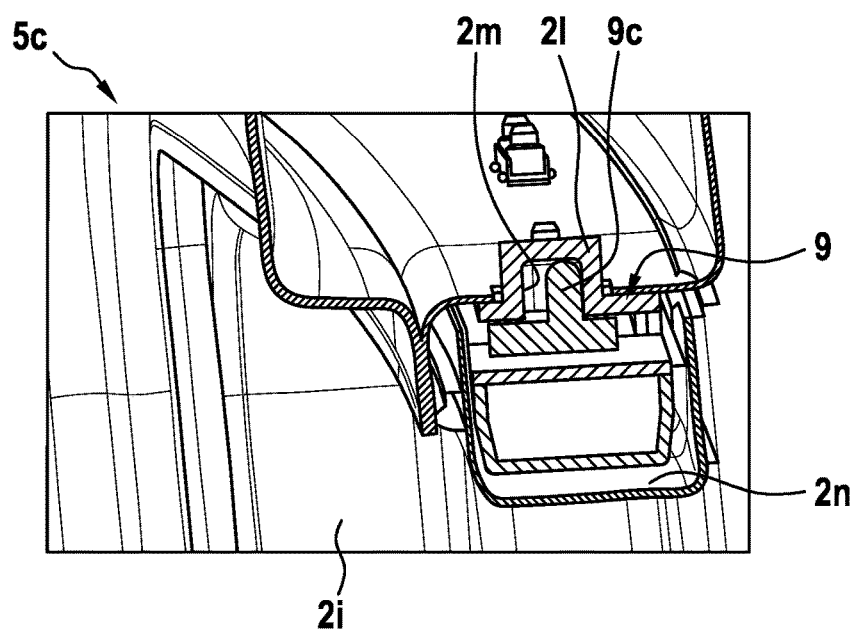
FIG. 9 shows a sectional view of the emergency exit retention device of FIG. 4 that is integrated into the board side sliding door window emergency exit of FIG. 2.

FIG. 9 shows the retention means 9 of FIG. 5 that is integrated into the outer peripheral edge 2*n* of the jettisonable emergency exit 5*c* and comprises the non-retractable pivot finger 9*c*. Preferably, the latter engages the frame groove 2*m* of FIG. 6 that is preferably embodied in the associated board side sliding door frame 2*l* of FIG. 3, which is provided in the board side sliding door arrangement 2*c* of the helicopter 1 of FIG. 1. This engagement is preferentially implemented within predetermined tolerances that can be determined in an application-specific manner in order to allow the rotational movement of the jettisonable emergency exit 5*c* in the emergency mode, as illustrated in part (B) of FIG. 3.

Figure 10:
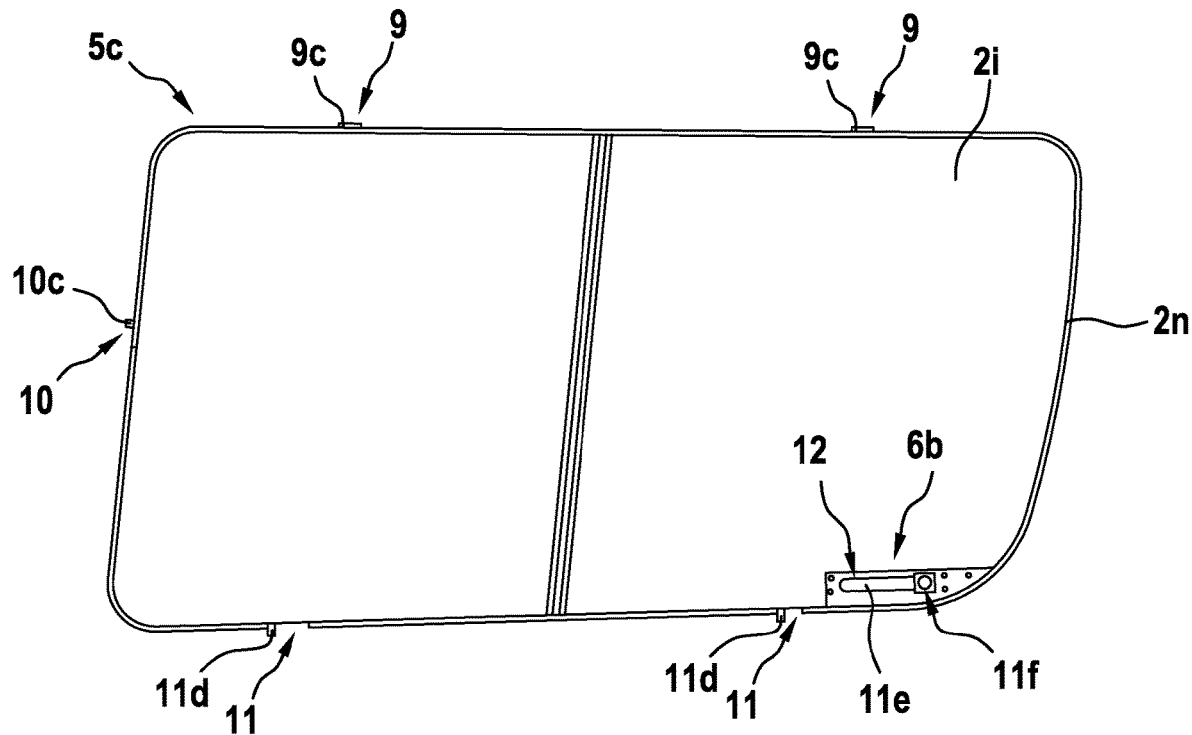
FIG. 10 shows a side view of an outer side of the board side sliding door window emergency exit of FIG. 2.

FIG. 10 shows the jettisonable emergency exit 5*c* of FIG. 1, FIG. 2 and FIG. 4, which is now exemplarily illustrated as seen from the outside of the fuselage 1*a* of the helicopter 1 of FIG. 1. As described above, the jettisonable emergency exit 5*c* comprises the two retention means 9 with the non-retractable pivot fingers 9*c* according to FIG. 5, the single lateral locking device 10 of FIG. 4 with the lateral locking hook 10*c* of FIG. 6 and the two lower locking devices 11 of FIG. 4 with the lower locking hooks 11*d* of FIG. 7.

FIG. 10 further illustrates the outer emergency exit activating system 6*b* of FIG. 2 that preferably comprises an outer activation handle 11*e*. The latter is preferably attached to the (second) emergency exit activation strap 12 of FIG. 4. Furthermore, according to one aspect of the present invention an outer release element 11*f*, preferably in the form of a push button, is provided that can be operated for an initial release of the outer activation handle 11*e* in case of an emergency, as described below with reference to FIG. 15.

Figure 11:
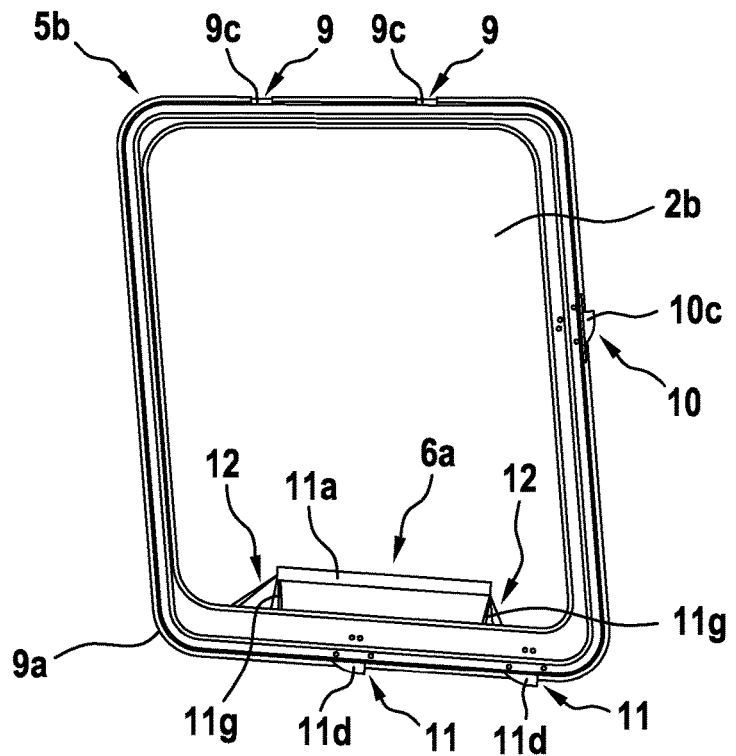
FIG. 11 shows a side view of an inner side of the board side passenger window emergency exit of FIG. 2.

FIG. 11 shows the jettisonable emergency exit 5*b* of FIG. 1 and FIG. 2, which is defined by the board side passenger window 2*b* of FIG. 2. The jettisonable emergency exit 5*b* is exemplarily illustrated as seen from the inside of the fuselage 1*a* of the helicopter 1 of FIG. 1.

According to one aspect of the present invention, the jettisonable emergency exit 5*b* comprises the two retention means 9 of FIG. 4 with the non-retractable pivot fingers 9*c* of FIG. 5, the single lateral locking device 10 of FIG. 4 with the lateral locking hook 10*c* of FIG. 6, and the two lower locking devices 11 of FIG. 4 with the lower locking hooks 11*d* of FIG. 7. Illustratively, the jettisonable emergency exit 5*b* further comprises the inner emergency exit activating system 6*a* of FIG. 4 that preferably comprises the inner activation handle 11*a* of FIG. 4. The latter is preferably attached to the (second) emergency exit activation strap 12 of FIG. 4.

It should be noted that preferably all jettisonable emergency exits 5 of FIG. 1 and FIG. 2 are provided with the two retention means 9 having the non-retractable pivot fingers 9*c*, the single lateral locking device 10 having the lateral locking hook 10*c*, and the two lower locking devices 11 having the lower locking hooks 11*d*. Firstly, such a configuration allows avoiding an undesired tilting movement of the respective jettisonable emergency exit during performance of the rotational opening movement according to part (B) of FIG. 3. Secondly, such a configuration allows a secure and reliable fixation of the respective jettisonable emergency exit in the associated board side sliding door frame 2*l* of FIG. 3 that is provided in the board side sliding door arrangement 2*c* of the helicopter 1 of FIG. 1.

It should further be noted that location and number of retention means 9, lateral locking devices 10 and lower locking devices 11 on an associated window frame is preferably determined in an application-specific manner. For instance, if windows having a height that is greater than their width should be equipped as jettisonable emergency exits, they can be provided with only a single lower locking device 11, but with two lateral locking devices 10, which may also be arranged on both lateral sides of the windows, and so on.

Finally, it should be noted that the retention means 9, the lateral locking device 10 and the lower locking device 11, and consequently the non-retractable pivot finger 9*c*, the lateral locking hook 10*c* and the lower locking hook 11*d*, can be implemented in various different ways, even in a manner that lies within the common knowledge of the skilled person. For instance, the lower locking hook 11*d* can be implemented in various different forms and shapes, e.g. as a pin-like finger, a cylindrical bolt, a plate-shaped segment of a circle and so on.

Figure 12:
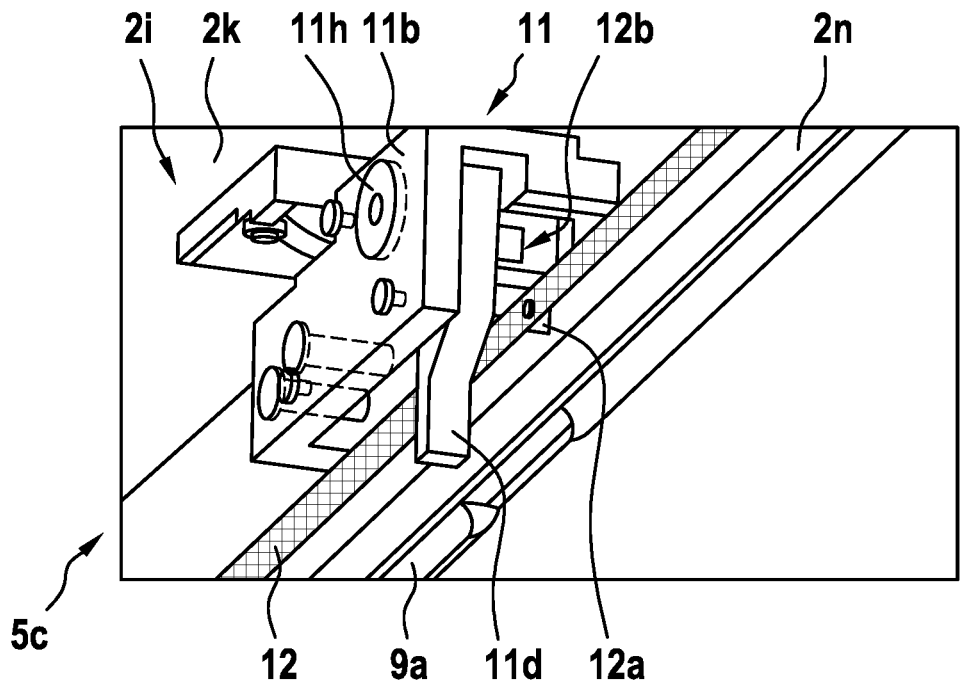
FIG. 12 shows a sectional view of the emergency exit lower locking device of FIG. 7.

FIG. 12 shows the jettisonable emergency exit 5*c* of FIG. 1, FIG. 2 and FIG. 4, for further illustration of the lower locking device 11 of FIG. 4 with the lower locking hook 11*d* of FIG. 7. In the illustrated example, the lower locking hook 11*d* is exemplarily embodied as a rotatable pin-like locking finger. This pin-like locking finger 11*d* is illustratively rotatable around an associated rotation axle 11*h*.

According to one aspect of the present invention, the pin-like locking finger 11*d* is rigidly attached to a strap fixation 12*a*. Alternatively, the pin-like locking finger 11*d* and the strap fixation 12*a* can be implemented as a one-piece component. The strap fixation 12*a* is preferably rigidly attached to the emergency exit activation strap 12 of FIG. 4, preferably to the first and second emergency exit activation straps 12 of FIG. 4, such that a translational movement of the activation strap 12 in it longitudinal direction is translated into a rotational movement of the pin-like locking finger 11*d*, as described above with reference to FIG. 7.

Figure 13:
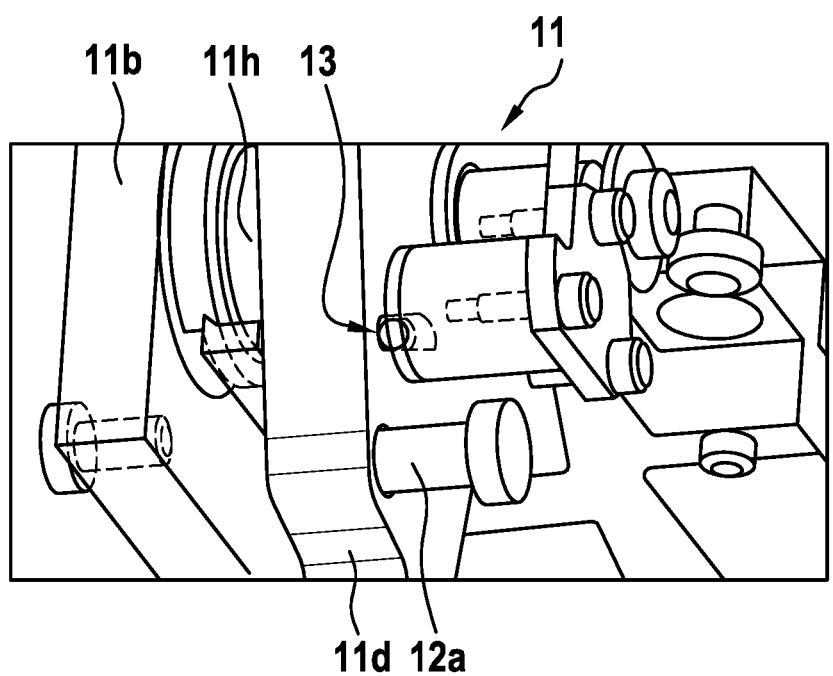
FIG. 13 shows an enlarged detail view of the emergency exit lower locking device of FIG. 12.

Preferably, the pin-like locking finger 11*d* is further coupled to an initial force generator device 12*b* and may also be coupled to at least one gravity retraction avoidance roller (13 in FIG. 13). The initial force generator device 12*b* is a well-known mechanical component, the functioning of which will be explained below with reference to FIG. 14 and FIG. 15. This similarly applies to the at least one gravity retraction avoidance roller (13 in FIG. 13), the functioning of which will be explained hereinafter with reference to FIG. 13.

FIG. 13 shows the lower locking device 11 of FIG. 12 with the at least one gravity retraction avoidance roller 13. The latter is preferably adapted for avoiding unintentional gravity-based retraction of the pin-like locking finger 11*d* from the associated locking position into the associated retracted position, as described above with reference to FIG. 7. FIG. 13 further illustrates the rigid attachment of the strap fixation 12*a* to the pin-like locking finger 11*d*.

Figure 14:
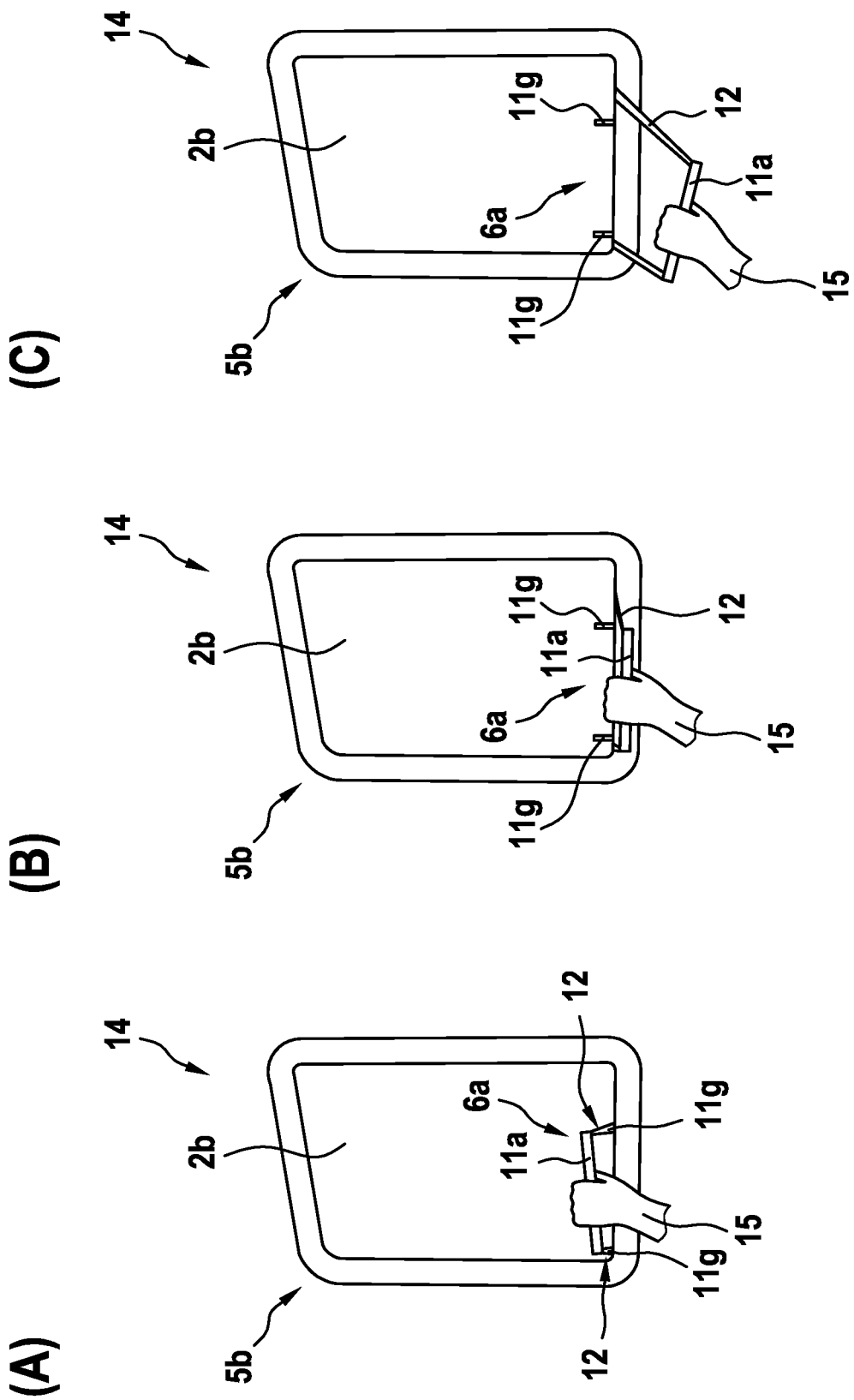
FIG. 14 shows a method of releasing the board side passenger window emergency exit of FIG. 2 for ejection from an associated vehicle using an inner activation handle.

FIG. 14 shows an exemplary method 14 of releasing a jettisonable emergency exit for ejection from an associated vehicle. By way of example, the method 14 is illustrated with respect to an ejection of the jettisonable emergency exit 5*b* of FIG. 1, FIG. 2 and FIG. 11, which is defined by the board side passenger window 2*b* of FIG. 2, from the fuselage 1*a* of the helicopter 1 of FIG. 1, e.g. in case of an emergency. However, it should be noted that for simplicity and clarity of the drawings only the jettisonable emergency exit 5*b* is shown in FIG. 14 and that illustration of the fuselage 1*a* of FIG. 1 has been omitted.

According to one aspect of the present invention, the method 14 is performed from the inside of the fuselage 1*a* of the helicopter 1 of FIG. 1 by means of the inner emergency exit activating system 6*a* of FIG. 4 that preferably comprises the inner activation handle 11*a* of FIG. 4, which is attached to the (first) emergency exit activation strap 12 of FIG. 4. The method starts with an operator, i.e. crew member or passenger, who grasps the activation handle 11*a* that is accommodated and retained in an initial position in the associated handle holder 11*g* of FIG. 4, illustratively with his right hand 15.

Initially, the operator manually moves the activation handle 11*a* of the jettisonable emergency exit 5*b* from the initial position into a first intermediate position. This is achieved by removing the activation handle 11*a* from the associated handle holder 11*g*, as illustrated in part (A) of FIG. 14.

Then, the operator manually moves the activation handle 11*a* from the first intermediate position into a second intermediate position by applying a first traction force. This first traction force is preferably a comparatively small traction force that is provided by the initial force generator device 12*b* of FIG. 12 and only required for drawing the emergency exit activation strap 12 out of the jettisonable emergency exit 5*b* such that a predetermined tensioning of the emergency exit activation strap 12 is achieved, as illustrated in part (B) of FIG. 14. However, until now no retraction or rotation of one of the locking hooks 10*c*, 11*d* of FIG. 11 occurs.

Finally, the operator manually moves the activation handle 11*a* from the second intermediate position into a release position by applying a second traction force. This is illustrated in part (C) of FIG. 14 and results in retraction or rotation of the locking hooks 10*c*, 11*d* of FIG. 11 from their associated locking position into their associated retracted position. The second traction force is preferably greater than the first traction force, but preferentially not greater than 200 N. According to one aspect of the present invention, when the activation handle 11*a* is in the release position, the jettisonable emergency exit 5*b* is ready for ejection from the associated vehicle, as the locking hooks 10*c*, 11*d* of FIG. 11 are retracted or rotated into their associated retracted position.

FIG. 15 shows an exemplary method 16 of releasing a jettisonable emergency exit for ejection from an associated vehicle. By way of example, the method 16 is illustrated with respect to an ejection of the jettisonable emergency exit 5*b* of FIG. 1, FIG. 2 and FIG. 11, which is defined by the board side passenger window 2*b* of FIG. 2, from the fuselage 1*a* of the helicopter 1 of FIG. 1, e.g. in case of an emergency. However, it should be noted that for simplicity and clarity of the drawings only the jettisonable emergency exit 5*b* is shown in FIG. 15 and that illustration of the fuselage 1*a* of FIG. 1 has been omitted.

According to one aspect of the present invention, the method 16 is performed from the outside of the fuselage 1*a* of the helicopter 1 of FIG. 1 by means of the outer emergency exit activating system 6*b* of FIG. 10 that preferably comprises the outer activation handle 11*e* of FIG. 10, which is attached to the (second) emergency exit activation strap 12 of FIG. 4 and which is releasable by means of the release push button 11*f* of FIG. 10. The method starts with an operator, i.e. crew member, passenger or emergency personal, who pushes the release push button 11*f* with a finger of his hand 15, as illustrated in part (A) of FIG. 15. Thereupon, the activation handle 11*e* that is accommodated and retained in the jettisonable emergency exit 5*b* is released from an initial position defined by the jettisonable emergency exit 5*b* into a first intermediate position, as illustrated in part (B) of FIG. 15.

Then, the operator grasps the activation handle 11*e*, illustratively with his right hand 15, and manually moves the activation handle 11*e* from the first intermediate position into a second intermediate position by applying a first traction force. This first traction force is preferably a comparatively small traction force that is provided by the initial force generator device 12*b* of FIG. 12 and only required for drawing the emergency exit activation strap 12 out of the jettisonable emergency exit 5*b* such that a predetermined tensioning of the emergency exit activation strap 12 is achieved, as illustrated in part (C) of FIG. 15. However, until now no retraction or rotation of one of the locking hooks 10*c*, 11*d* of FIG. 11 occurs.

Finally, the operator manually moves the activation handle 11*e* from the second intermediate position into a release position by applying a second traction force. This is illustrated in part (C) of FIG. 15 and results in retraction or rotation of the locking hooks 10*c*, 11*d* of FIG. 11 from their associated locking position into their associated retracted position. The second traction force is preferably greater than the first traction force, but preferentially not greater than 200 N. According to one aspect of the present invention, when the activation handle 11*e* is in the release position, the jettisonable emergency exit 5*b* is ready for ejection from the associated vehicle, as the locking hooks 10c, 11d of FIG. 11 are retracted or rotated into their associated retracted position.

It should be noted that modifications to the above described embodiments are within the common knowledge of the person skilled in the art and, thus, also considered as being part of the present invention. It should further be noted that the drawings are only intended for schematically representing embodiments of the present invention and not for showing detailed constructions thereof.

REFERENCE LIST 1 rotary wing aircraft
1a fuselage
1b tail boom
1c tail wing
1d fin
1e tail rotor shroud
1f drive system accommodating region
1g aircraft outer surface
1h board side wall
1i starboard side wall
2 aircraft doors and windows
2a co-pilot door
2b board side passenger window
2c board side sliding door
2d pilot door
2e starboard side passenger window
2f starboard side sliding door
2g co-pilot door window
2h pilot door window
2i board side sliding door window
2j starboard side sliding door window
2k board side sliding door window pane
2l board side sliding door frame
2m frame groove
2n board side sliding door window frame
3 firewall arrangement
3a front firewall
3b mid firewall
3c rear firewall
4 maintenance traps
4a, 4b starboard side maintenance traps
4c board side maintenance traps
5 aircraft emergency exits
5a co-pilot door window emergency exit
5b board side passenger window emergency exit
5c board side sliding door window emergency exit
6a inner emergency exit activating system
6b outer emergency exit activating system
7a lower window edge
7b upper window edge
7c lateral window edges
7d predetermined angle
8a rotational opening movement
8b translational ejection movement
9 emergency exit retention means
9a window seals
9b retention means support
9c retention means pivot finger
10 emergency exit lateral locking device
10a lateral locking device support
10b lateral locking hook rotating means
10c rotatable lateral locking hook
11 emergency exit lower locking device
11a lower locking device inner activation handle
11b lower locking device support
11c lower locking hook rotating means
11d rotatable lower locking hook
11e lower locking device outer activation handle
11f lower locking device outer release button
11g handle holder
11h lower locking hook rotation axle
12 emergency exit activation strap
12a strap fixation
12b initial force generator device
13 gravity rotation avoidance roller
14 emergency exit opening procedure from inside
15 user hand
16 emergency exit opening procedure from outside

What is claimed is:

1. A jettisonable emergency exit for a vehicle, comprising:
a jettisonable panel having an outer peripheral edge that is adapted to be received in an opening of a frame provided in a vehicle,
at least one emergency exit retention means integrated into the outer peripheral edge of the panel, the at least one emergency exit retention means comprising at least one non-retractable pivot finger around which the jettisonable panel is rotatable in an emergency mode,
at least one emergency exit locking device integrated in the outer peripheral edge and comprising at least one locking hook that is adapted for locking the jettisonable panel in a locking position in normal operation mode and for releasing the jettisonable panel in a retracted position in the emergency mode,
an emergency activation strap connected to the at least one locking hook, wherein actuation of the strap moves the hook from the locking position into the retracted position.

2. The jettisonable emergency exit according to claim 1, wherein the emergency exit activation strap comprises synthetic fibers that are based on polyamide.

3. The jettisonable emergency exit according to claim 1, wherein the emergency exit activation strap comprises nylon.

4. The jettisonable emergency exit according to claim 1, wherein a first emergency exit locking device with a first locking hook is provided at a first peripheral edge, and wherein a second emergency exit locking device with a second locking hook is provided at a second peripheral edge, the first and second locking hooks connected to the emergency exit activation strap.

5. The jettisonable emergency exit according to claim 4, wherein the first peripheral edge and the second peripheral edge are arranged at 90° to each other.

6. The jettisonable emergency exit according to claim 4, wherein a third emergency exit locking device with a third locking hook is provided at the second peripheral edge.

7. The jettisonable emergency exit according to claim 6, wherein the third locking hook is connected to the emergency exit activation strap.

8. The jettisonable emergency exit according to claim 1, wherein the at least one locking hook is rotatable by actuation of the emergency exit activation strap.

9. The jettisonable emergency exit according to claim 1, wherein the emergency exit activation strap is attached to at least one activation handle, the at least one activation handle manually movable from an initial position defined by a handle holder into a first intermediate position by applying an initial release force and further manually movable from the first intermediate position into a second intermediate position by applying a first traction force, and from the second intermediate position into a release position by applying a second traction force, the second traction force greater than the first traction force, wherein the at least one locking hook is retracted into the retracted position when the at least one activation handle is in the release position.

10. The jettisonable emergency exit according to claim 9, wherein the at least one activation handle defines an inner activation handle and wherein at least one other activation handle is provided, the at least one other activation handle defining an outer activation handle, the inner and outer activation handles arranged on opposed sides of the jettisonable emergency exit.

11. The jettisonable emergency exit according to claim 10, wherein the outer activation handle is releasable by means of a release element for movement from an initial position into a first intermediate position, the outer activation handle manually movable from the first intermediate position into a second intermediate position by applying a first traction force, and from the second intermediate position into a release position by applying a second traction force, the second traction force greater than the first traction force, wherein the at least one locking hook is retracted into the retracted position when the outer activation handle is in the release position.

12. The jettisonable emergency exit according to claim 10, wherein the at least one locking hook is retractable from the locking position into the retracted position by means of another emergency exit activation strap, the another emergency exit activation strap attached to the outer activation handle.

13. The jettisonable emergency exit according to claim 1, wherein the at least one emergency exit retention means and the at least one emergency exit locking device are adapted to allow a rotation of the jettisonable panel in the emergency mode prior to a translational ejection movement of the jettisonable panel, the translational ejection movement being performable in a plane defined by the jettisonable panel.

14. The jettisonable emergency exit according to claim 1, wherein at least one gravity retraction avoidance roller coupled to the locking hook, the at least one gravity retraction avoidance roller adapted for avoiding unintentional gravity-based retraction of the at least one locking hook from the locking position into the retracted position.

15. The jettisonable emergency exit according to claim 1, wherein the jettisonable panel comprises a vehicle window, wherein the outer peripheral edge and wherein the vehicle frame comprises a window frame.

16. A jettisonable emergency exit for a vehicle, comprising:
a jettisonable panel having an outer periphery configured to be received in a vehicle frame defining an exit opening on the vehicle;
a non-retractable pivot finger protruding from a first edge of the outer periphery;
at least one locking hook mounted to move relative to a second edge of the outer periphery between a locking position where the hook engages the vehicle frame and a retracted position in which the hook releases the vehicle frame; and
an activation strap connected to the locking hook to move the locking hook from the locking position and to the retracted position during an emergency mode,
wherein actuation of the activation strap thereby retracts the locking hook to allow the second edge of the periphery to pivot away from the vehicle frame when the first edge pivots about the non-retractable pivot finger; wherein the non-retractable pivot finger has a curved end portion configured to facilitate rotational opening of the jettisonable panel relative to the frame of the vehicle.

17. The jettisonable emergency exit according to claim 16, wherein the at least one locking hook comprises first and second locking hooks connected to the activation strap, wherein the first locking hook is provided at a first peripheral edge, and wherein the second locking hook is provided at a second peripheral edge arranged perpendicular to the first peripheral edge.

18. The jettisonable emergency exit according to claim 1, further comprising a force generator connected to the strap, wherein when the handle is pulled away from the panel to an intermediate locked position, the force generator provides tension to the strap, and when the handle is pulled away from the panel to a release position farther than the intermediate locked position, the locking hook is retracted to disengage the vehicle frame.

* * * * *